United States Patent
Jiang et al.

(10) Patent No.: US 10,286,752 B2
(45) Date of Patent: May 14, 2019

(54) REFRIGERANT CIRCULATION SYSTEM

(71) Applicant: Hangzhou Sanhua Research Institute Co., Ltd., Hangzhou, Zhejiang (CN)

(72) Inventors: Xiaojun Jiang, Zhejiang (CN); Yibing Jiang, Zhejiang (CN); Jinguo Dan, Zhejiang (CN); Rongrong Zhang, Zhejiang (CN)

(73) Assignee: Hangzhou Sanhua Research Institute Co., Ltd., Hangzhou (CN)

( * ) Notice: Subject to any disclaimer, the term of this patent is extended or adjusted under 35 U.S.C. 154(b) by 343 days.

(21) Appl. No.: 15/024,430

(22) PCT Filed: Sep. 28, 2014

(86) PCT No.: PCT/CN2014/087660
§ 371 (c)(1),
(2) Date: Mar. 24, 2016

(87) PCT Pub. No.: WO2015/043519
PCT Pub. Date: Apr. 2, 2015

(65) Prior Publication Data
US 2016/0221416 A1    Aug. 4, 2016

(30) Foreign Application Priority Data
Sep. 28, 2013   (CN) .......................... 2013 1 0455110

(51) Int. Cl.
*F25B 49/02*    (2006.01)
*B60H 1/00*     (2006.01)
(Continued)

(52) U.S. Cl.
CPC ....... *B60H 1/00885* (2013.01); *F25B 41/062* (2013.01); *F25B 49/02* (2013.01);
(Continued)

(58) Field of Classification Search
CPC ......... B60H 1/00885; F25B 2341/0653; F25B 2600/2513; F25B 41/062; F25B 49/02; G05B 15/02; Y02B 30/72
(Continued)

(56) References Cited

U.S. PATENT DOCUMENTS 4,523,435 A * 6/1985 Lord ..................... F25B 41/062
236/78 D
4,549,404 A * 10/1985 Lord ..................... F25B 49/02
62/224
(Continued)

FOREIGN PATENT DOCUMENTS

CN       101089494 A     12/2007
CN       101900464 A     12/2010
(Continued)

OTHER PUBLICATIONS

International Search Report for International Application No. PCT/CN2014/087660.
(Continued)

*Primary Examiner* — Henry T Crenshaw
(74) *Attorney, Agent, or Firm* — Boyle Fredrickson S.C.

(57) ABSTRACT

A refrigerant circulation system includes a control system and an electronic expansion valve. The control system includes a central processing module, a step drive control module, and a drive module. The operation of the electronic expansion valve in the refrigerant circulation system includes an initialization operation stage and a flow adjustment operation stage, and a maximum operation speed of the electronic expansion valve in the flow adjustment operation stage is smaller than or equal to a maximum operation speed of the electronic expansion valve in the initialization operation stage, and a minimum operation speed of the electronic expansion valve in the flow adjustment operation stage is smaller than a minimum operation speed of the electronic
(Continued)

expansion valve in the initialization operation stage, so that stable and fast adjustment of the system can be implemented, and the system keeps stable running.

20 Claims, 7 Drawing Sheets (51) Int. Cl.
    *F25B 41/06* (2006.01)
    *G05B 15/02* (2006.01)
(52) U.S. Cl.
    CPC ...... *G05B 15/02* (2013.01); *F25B 2341/0653* (2013.01); *F25B 2600/2513* (2013.01); *Y02B 30/72* (2013.01)
(58) Field of Classification Search
    USPC .......................................................... 62/222
    See application file for complete search history.

(56) References Cited

U.S. PATENT DOCUMENTS

| | | | | |
|---|---|---|---|---|
| 4,620,424 A * | 11/1986 | Tanaka | ............ | F25B 41/062 62/222 |
| 4,674,292 A | 6/1987 | Ohya et al. | | |
| 6,397,628 B1 * | 6/2002 | Watanabe | ............ | F16K 25/04 236/92 B |
| 2003/0155428 A1 * | 8/2003 | Fiegle | ............ | F24F 11/30 236/49.3 |
| 2005/0284164 A1 * | 12/2005 | Ohta | ............ | F25B 49/02 62/228.3 |
| 2007/0062207 A1 * | 3/2007 | Aiyama | ............ | F25B 41/062 62/222 |
| 2008/0000245 A1 * | 1/2008 | Hong | ............ | F25B 13/00 62/222 |
| 2011/0232311 A1 * | 9/2011 | Korenaga | ............ | F24F 3/065 62/222 |
| 2013/0160474 A1 * | 6/2013 | Qu | ............ | F25B 41/062 62/222 |
| 2015/0362236 A1 * | 12/2015 | Jiang | ............ | F25B 41/062 137/12 |
| 2017/0120718 A1 * | 5/2017 | Blatchley | ............ | B60H 1/00028 |

FOREIGN PATENT DOCUMENTS

| | | | |
|---|---|---|---|
| CN | 102374328 | * | 3/2012 |
| CN | 102374328 A | | 3/2012 |
| CN | 103115182 A | | 5/2013 |
| EP | 2369250 A2 | | 9/2011 |
| JP | S6136671 A | | 2/1986 |
| JP | H01312360 A | | 12/1989 |
| JP | H0599517 A | | 4/1993 |
| JP | H09189456 A | | 7/1997 |
| JP | 2008101815 A | | 5/2008 |
| JP | 2011196649 A | | 10/2011 |
| KR | 20080013033 A | | 2/2008 |

OTHER PUBLICATIONS

European Search Report; Application No. 14847489.3; dated May 4, 2017.

* cited by examiner

REFRIGERANT CIRCULATION SYSTEM

CROSS-REFERENCE TO RELATED APPLICATIONS

This application is the national phase of International Application No. PCT/CN2014/087660, titled "REFRIGERANT CIRCULATION SYSTEM", filed on. Sep. 28, 2014, which claims the benefit of priority to Chinese Patent Application No. 201310455110.2 titled "REFRIGERANT CIRCULATION SYSTEM", filed with the Chinese State intellectual Property Office on Sep. 28, 2013, the entire disclosures of both applications are incorporated herein by reference.

TECHNICAL FIELD

The present application relates to a refrigerant circulation system, and particularly relates to a refrigerant circulation system provided with an electronic expansion valve.

BACKGROUND

As a new throttling element, an electronic expansion valve has been widely used in the field of household air conditioners. The electronic expansion valve may flexibly change the flow of refrigerant in an air-conditioning system according to requirement of the system, to effectively control the degree of superheat, thereby improving the system efficiency. The electronic expansion valve is a mechanism in which a valve needle is driven to move by a step motor, and an opening of the valve needle is controlled to adjust the size of a valve port, thus adjusting the flow of the refrigerant.

In the household air-conditioning system, a controller provides a voltage pulse sequence to a coil of the step motor in the electronic expansion valve regularly, such that the coil of each phase of the step motor is energized or de-energized according to a certain rule, to regularly control the change of the magnetism of each claw pole of a stator of the coil, and further control the rotation of a rotor, and the rotation of the rotor drives the valve needle to move upward and downward, to achieve the purpose of regulating the flow rate. In an immobile air conditioning system such as the household air-conditioning system, the air-conditioning system is located in a relatively stable environment, and the electronic expansion valve performs flow regulation at a constant speed.

In a mobile air-conditioning system, such as a vehicle air-conditioning system, or other refrigerant circulation systems, the system is located in a complicated and changeable environment, thus the system is required to cope with the effects on the system caused by the change of the environment with a smarter and more flexible manner.

SUMMARY

An object of the present application is to enable a system to reduce oscillation caused by an action of an electronic expansion valve and reduce an action time of the electronic expansion valve when necessary. In view of this, the following technical solutions are provided according to the present application.

A refrigerant circulation system includes a control system and an electronic expansion valve, and the control system includes a central processing module and a step drive controlling module.

The central processing module is configured to receive and parse system control information, and send a parsed control signal for the electronic expansion valve to the step drive controlling module, and record or store current opening information of the electronic expansion valve; or the central processing module is configured to receive an input signal and/or a sensor signal, generate by calculation a control signal for the electronic expansion valve, send the control signal generated for the electronic expansion valve to the step drive controlling module, and record or store current opening information of the electronic expansion valve.

In the case that no drive module is provided in the control system separately, the step drive controlling module is configured to receive the control signal for controlling the electronic expansion valve sent from the central processing module, and provide electricity to coils of the electronic expansion valve, wherein the electricity is sent by the central processing module and meet a requirement of the control signal for controlling the electronic expansion valve.

In the case that a drive module is provided in the control system, the step drive controlling module is configured to receive the control signal for controlling the electronic expansion valve sent from the central processing module, and control the drive module to allow a change of electricity flowing through coils of the electronic expansion valve to meet a requirement of the control signal for controlling the electronic expansion valve sent from the central processing module; and the drive module is configured to provide electricity to the coils of the electronic expansion valve according to a requirement of a signal from the step drive controlling module.

An operation of the electronic expansion valve in the refrigerant circulation system includes an initialization operation stage and a flow adjustment operation stage, and a maximum operation speed of the electronic expansion valve in the flow adjustment operation stage is smaller than or equal to a maximum operation speed of the electronic expansion valve in the initialization operation stage, and a minimum operation speed of the electronic expansion valve in the flow adjustment operation stage is smaller than a minimum operation speed of the electronic expansion valve in the initialization operation stage.

Compared with the conventional technology, the operation speed of the electronic expansion valve according to the present application may be adjusted according to requirements of the operation condition, for example, the air-conditioning system is allowed to operate at a fast speed when the electronic expansion valve is initialized, to come into the operation condition of the air-conditioner as quick as possible, and in a normal adjustment, the operation speed of the electronic expansion valve is changed according to the operation conditions, thereby ensuring that the system can operate stably while coming into the operation condition quickly.

DETAILED DESCRIPTION

Figure 1:
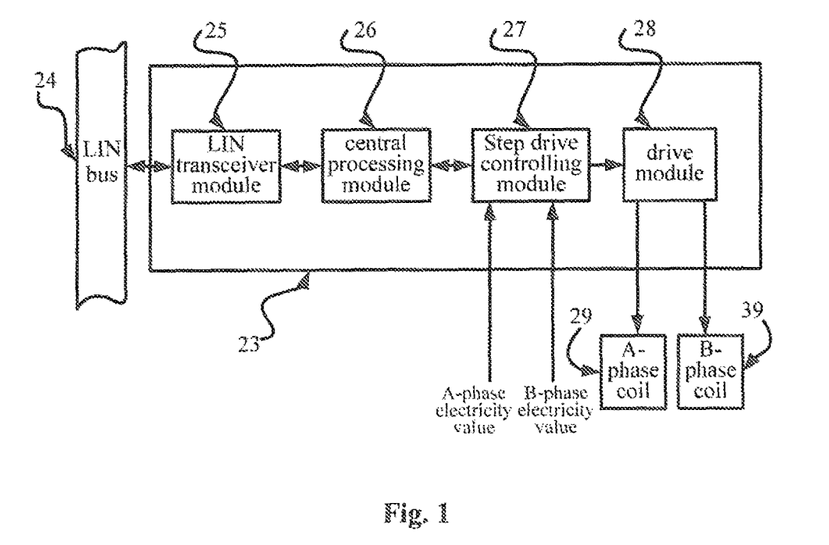
FIG. 1 is a schematic diagram of signal connection according to a first embodiment of the present application.

The embodiments of the present application are illustrated hereinafter with reference to the drawings, and the embodiments are described by taking a vehicle air-conditioning system as an example. Reference is made to FIG. 1, according to a first embodiment of the present application, FIG. 1 schematically shows an electric control part of a control system connected to a local interconnect network (LIN) bus and configured to control an electronic expansion valve (EXV).

The control system includes an electric control part 23 and a mechanical part. The electric control part 23 includes an LIN transceiver module 25, a central processing module 26, a step drive controlling module 27, and a drive module 28. The electric control part 23 is connected to an LIN bus 24 by an LIN line. The step drive controlling module 27 controls a switching tube in the drive module 28 to be switched on or switched off regularly, to allow a electricity to flow through an A-phase coil 29 and a B-phase coil 39 of the EXV according to a predetermined rule, thereby achieving control drive of the operation of the electronic expansion valve; meanwhile, the step drive controlling module 27 further receives information about an A-phase electricity value and a B-phase electricity value.

The LIN transceiver module 25 receives a frame on the LIN bus via the LIN line, transforms voltage levels of digital signals constituting the frame, and then sends the transformed result to the central processing module 26, and further receives, transforms and transfers a signal sent from the central processing module 26. The central processing module 26 parses the frame, and sends a control signal for the electronic expansion valve obtained after parsing to the step drive controlling module 27, and receives and transfers a feedback signal transferred back from the step drive controlling module 27, and records or stores information about a current opening of the electronic expansion valve. In this embodiment, the central processing module 26 may first determine a frame identifier in a frame header, and in the case that the determination result indicates that the frame information is a command frame directing to EXV, the central processing module 26 further receives a frame response, and parses the signal in the frame response or parses the signal of the frame response of the frame information which has been received. In the case that the parsed result indicates that the electronic expansion valve is required to be adjusted from the current opening to a target opening, the central processing module 26 calculates according to information about the current opening and the target opening to obtain a step size information and a motor drive direction (i.e., a rotational direction) information, and provides the step size information and the motor drive direction information to the step drive controlling module 27. The step drive controlling module 27, after receiving the step size information and the motor drive direction information, controls the drive module 28 to allow the electricity flowing through the A-phase coil and the B-phase coil to change, to meet requirements of the value of the step size and the motor drive direction. During the process of the electricity flowing through the A-phase coil and the B-phase coil, the electricity of the A-phase coil and the electricity of the B-phase coil are fed back in real time to the step drive controlling module 27, and are used to monitor the electricity values in the coils, to allow the step drive controlling module 27 to control the switching of the switching tube in the drive module 28. The central processing module 26 includes a timer (TIMER) module, and the central processing module sets a timing value of the TIMER module by calculation, when the timing value is reached, the central processing module outputs a level signal and provides the level signal to the step drive controlling module 27, thereby controlling the action speed of a step motor. In addition, the calculation of the central processing module 26 may be built in the central processing module 26 by simulation or experiment, and the central processing module 26 performs calculation after receiving a related signal to obtain a corresponding value, or obtains a corresponding value directly through a built-in table, and etc.

The step drive controlling module 27 and the drive module 28 of the electric control part in the embodiment shown in FIG. 1 may be integrated in one integrated circuit (IC), i.e., the drive module 28 is not arranged independently, for example, an NCV70501 chip from Onsemi company, or an A4980 chip from Allegro company, or other integrated chips for step motor drive may be used. The LIN transceiver module 25 and the central processing module 26 may each be an independent integrated circuit, for example, the LIN transceiver module may be a 1028 integrated chip from NXP company, and the central processing module may be an 8-bit single chip microcomputer, such as an HCS08 series single chip microcomputer from freescale company. Further, the above four modules may also be integrated into one integrated circuit, for example, an E523 integrated chip from Elmos company, and etc. These control system may be provided in an air-conditioning system, and may also be fixedly arranged in an electronic expansion valve or at a position close to the electronic expansion valve.

Figure 2:
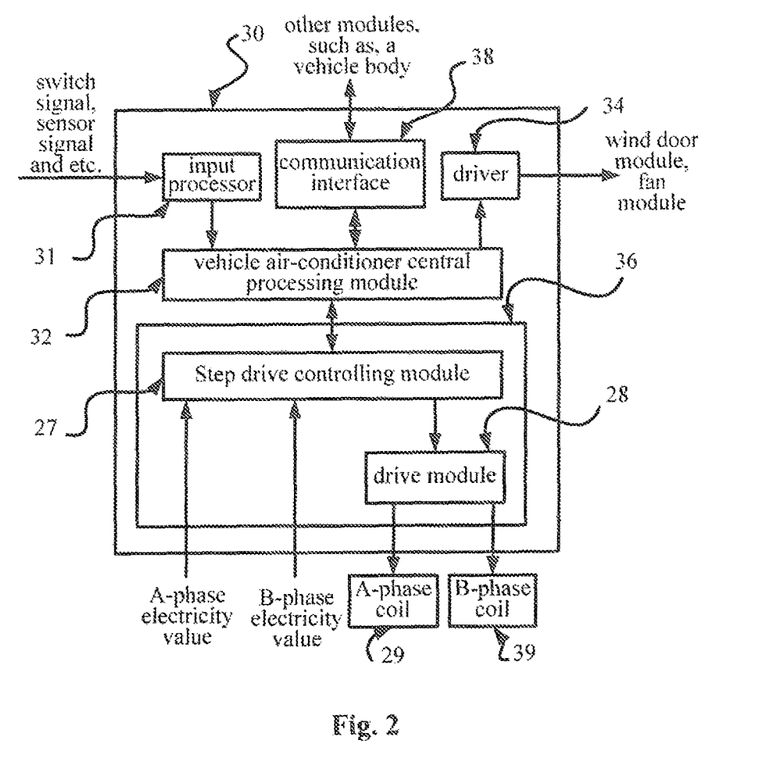
FIG. 2 is a schematic diagram of signal connection according to a second embodiment of the present application.

In the first embodiment described above, the electric control part 23 is in communication with the LIN bus via the LIN line, and in other embodiments, the signal connection between the electric control part and the LIN bus may be realized by other manners. Reference is made to FIG. 2, which is a schematic diagram of signal connection according to another embodiment of the present application. The vehicle air-conditioning control device 30 is the center of the entire vehicle air-conditioning control, and in addition to the electric control part 36 for controlling the EXV, also includes other various modules related to the implementation of the vehicle air-conditioning control, here, only the part related to the present application is schematically illustrated. In this embodiment, the vehicle air-conditioning control device 30 further includes an input processor 31, a vehicle air-conditioner central processing module 32, a driver 34, and a communication interface 38. The vehicle air-conditioner central processing module 32 here functions as a central processing module of the refrigerant circulation system.

The input processor 31 is configured to receive various switch control signals inputted from an air-conditioner control panel (not shown), and is further configured to receive signals detected by various sensors arranged in pipelines of the air-conditioning system, for example, temperature values of refrigerant or air detected by various temperature sensors, or pressure values of the refrigerant detected by various pressure sensors, and etc. The input processor 31 processes or transforms various switch signals and sensor signals inputted, for example filtering or level transforming, and outputs signals obtained by processing or transforming to the vehicle air-conditioner central processing module 32. The communication interface 38 is configured to receive signals sent by other modules in the vehicle, for example, an engine rotational speed signal, a fan rotational speed signal, a quick shut-off EXV signal, a quick fully-open EXV signal, and etc. The interface may be a controller area network (CAN) interface.

The vehicle air-conditioner central processing module 32 calculates according to the switch control signals and the sensor signals processed and then inputted by the input processor 31 and the signals inputted via the communication interface 38, and in combination with a control program and information stored in its own storage, to obtain a control signal, to control various units to be controlled in the vehicle air-conditioning system, for example, the electric control part 36 for controlling the EXV, the driver 34 for driving modules such as a fan or an air gate, and etc. The electric control part 36 includes a step drive controlling module 27 and a drive module 28. The step drive controlling module 27, after receiving from the vehicle air-conditioner central processing module 32 step size information and motor drive direction information sent for controlling the electronic expansion valve, controls the drive module 28 to allow the electricity flowing through the A-phase coil 29 and the B-phase coil 39 of the electronic expansion valve to change, to meet the requirements of the value of the step size and the motor drive direction. Similarly, the electricity values of the A-phase coil 29 and the B-phase coil 39 are transmitted to the vehicle air-conditioner central processing module 32 via the step drive controlling module 27. The vehicle air-conditioner central processing module calculates a timing value for setting the TIMER module in the central processing module, and when the timing value is reached, the central processing module outputs a level signal and provides the level signal to the step drive controlling module 27, thereby controlling the action speed of the step motor.

Unlike the embodiment shown in FIG. 1, in this embodiment, the electric control part for controlling the EXV is integrated into the vehicle air-conditioning control device 30, to become a part of the device, hence, in one aspect, an LIN transceiver module is not required, and in another aspect, it is not required to specially provide an independent central processing module for the EXV, and the EXV may share the vehicle air-conditioner central processing module 32 in the vehicle air-conditioning control device 30 with other modules.

The vehicle air-conditioner central processing module 32 calculates according to the switch control signals and the sensor signals processed and then inputted by the input processor 31 and the signals inputted via the communication interface 38, in combination with the current opening information of the EXV stored in its own storage, to obtain step size information and motor drive direction (i.e., the rotational direction) information which are required to be provided to the step drive controlling module 27, and provides the step size information and the motor drive direction information to the step drive controlling module 27. After receiving the value of the step size and the motor drive direction information, the step drive controlling module 27 performs the same control to the drive module 28 as that in the above embodiment. The electric control part 36 may be integrated into an integrated circuit, such as an NCV70501 chip from Onsemi company, or an A4980 chip from Allegro company, or other integrated chips for step motor drive. The vehicle air-conditioner central processing module may be a 16-bit single chip microcomputer, for example, a MC9S12G series single chip microcomputer from Freescale company.

Figure 3:
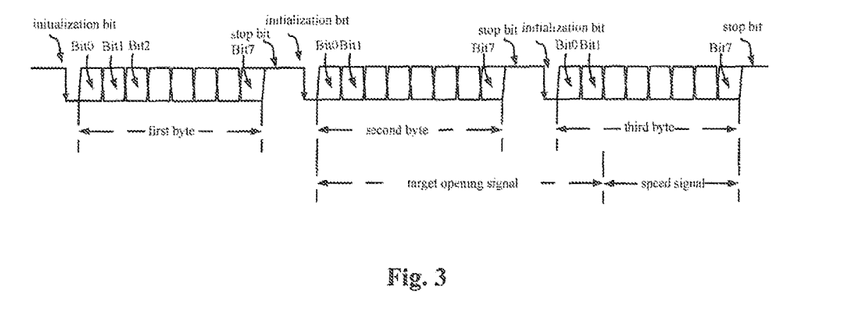
FIG. 3 is a schematic diagram showing the distribution of signals in an LIN frame response.

FIG. 3 is a schematic diagram showing the distribution of LIN command frame response in the case that a related signal is sent to the central processing module 26 in the first embodiment. Bit0 of the first byte in the LIN command frame is a quick shut-off signal. When a vehicle is in an emergency situation such as collision, or when it is necessary, a host node for controlling the EXV validates the quick shut-off signal, and sends the quick shut-off signal to the control system via the LIN bus, to control the EXV to perform a quick shut-off action; in addition, the quick shut-off signal may also be read by the LIN transceiver module via the LIN bus. Bit1 of the first byte is a quick fully-open signal. When the air-conditioning system detects an abnormal high pressure, or when it is necessary, the host node for controlling the EXV validates the quick fully-open signal, and sends the quick fully-open signal to the control system via the LIN bus, to control the EXV to perform a quick fully-open action; in addition, the quick fully-open signal may also be read by the LIN transceiver module via the LIN bus. Bit2 of the first byte is an initialization signal. The entire second byte and initial two bits of the third byte constitute a target opening signal which may have 10 bits. The value in the target opening signal may be a position corresponding to the EXV target steps; and may also be a percentage of a position corresponding to the EXV target opening relative to a position corresponding to the maximum opening, for example 1023 (i.e., 10 bits are all 1) represents 100% opening. In the case that the speed information of the electronic expansion valve is also provided by the system, the high-order six bits of the third byte may be a speed lever signal. For example, in the case that the speed level information is represented by six bits, 64 speed levels may be represented at most.

In this embodiment, apparently, the "quick shut-off signal" and the "quick fully-open signal" may also not be defined, and may be indicated by the combination of a "target opening signal" and a "speed signal". For example, in the case that the received "target opening signal" is 0, while the received "speed signal" is a maximum value, the EXV performs a quick fully-shut-off action; and in the case that the received "target opening signal" is 100%, while the received "speed signal" is the maximum value, the EXV performs a quick fully-open action.

For another embodiment, the vehicle air-conditioner central processing module does not involve receiving and sending of an LIN signal, and the quick shut-off signal, the quick fully-open signal may be inputted as CAN signals via a communication interface 38. The vehicle air-conditioner central processing module 32 may perform a built-in program to calculate according to the input signals inputted by the input processor 31 and the communication interface 38, to obtain the initialization signal, the target opening signal and the speed signal, and hence, the three signals are not required to be defined specially.

For the first embodiment, as described hereinabove, the speed level signal may also be not defined in the signal frame, and the central processing module 26 may calculate according to a stored current EXV opening signal and a received EXV target opening information to obtain the speed level signal, for example, different motor operating speeds may be determined according to the calculation results.

Figure 4:
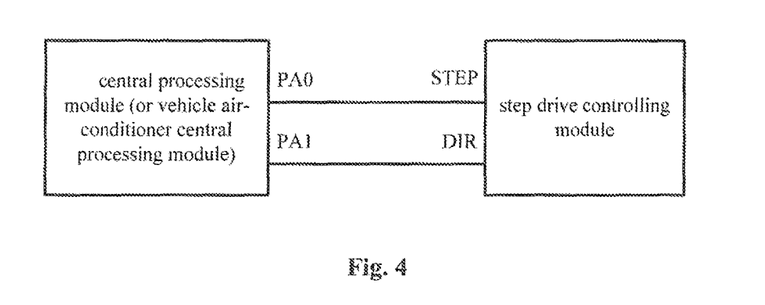
FIG. 4 is a schematic view showing a connection manner between related pins of a central processing module or a vehicle air-conditioner central processing module and a step drive controlling module.

FIG. 4 is a schematic diagram showing a manner of connection between related pins of the central processing module (or the vehicle air-conditioner central processing module) and the step drive controlling module 27. The pins of the step drive controlling module 27 connected to the central processing module include a step (STEP) pin and a direction (DIR) pin. The STEP pin is in communication with a PA0 pin of the central processing module, and the DIR pin is in communication with a PA1 pin of the central processing module. The step drive controlling module 27 receives step size information via the STEP pin, and receives an action direction signal of the electronic expansion valve via the DIR pin. The central processing module outputs voltage signals to the STEP pin and the DIR pin respectively via the PA0 pin and the PA1 pin. When the voltage outputted by the PA0 pin to the STEP pin is switched, for example, switched from a low level to a high level, the step drive controlling module controls the drive module to allow the electricity flowing through the coils to change, thereby controlling the motor of the electronic expansion valve to act. Each time the electricity changes, the motor rotates by one single step size. The single step size in this specification refers to the step size by which the motor moves in one action, and the step size does not exceed a full step at the most. That is, for the manner in which the motor is driven by a STEP signal to act, each time the STEP signal changes effectively, the motor will act by the value of the single step size.

The rotational direction of the motor is controlled by an input signal of the DIR pin, for example, in the case that the input signal of the DIR pin is a high level, correspondingly, the motor rotates forwardly. Here, the value of each single step size may be set and adjusted, and is not necessarily a full step determined by the structure of the motor itself, but may be micro-step values such as ½ of a full step, ¼ of a full step, ⅛ of a full step and ¹⁄₁₆ of a full step. When the system is required to be finely adjusted, the value of the single step size may employ a small micro-step value or a full step value, and when a quick action is required, the value of the single step size may employ a large micro-step value or a full step value. The magnitude of the single step size of the rotation of the motor of the electronic expansion valve may be achieved by setting a single step size on a chip, and outputting a phase relationship of the electricity values of the two-phase coils by the step drive module. The single step size may be a full step, and may also be a micro-step, i.e., the magnitude of the single step size depends on a motor operating micro-step value set in the step drive controlling module. For example, a micro-step mode value is determined by being written by the central processing module into a step drive controlling module register (for example, a configuration register 0) via a serial peripheral interface (SPI). Since in this manner, the motor only rotates when the voltage on the STEP pin is switched and the direction is valid, the time for the motor to move by a single step size may be controlled by controlling the switching cycle of the voltage on the STEP pin, thereby controlling the action speed of the motor. If the switching cycle is long, the rotational speed of the motor is low; and if the switching cycle is short, the rotational speed of the motor is high. For example, the span of the switching cycle may be controlled by utilizing the TIMER module in the central processing module. When the interval set by the TIMER module elapses, an interruption is activated, and the voltage outputted to the STEP pin by the PA0 pin is switched in the interrupt program. In this way, by changing the timing time, the speed of the motor may be controlled. The interval may be obtained by the central processing module through calculation according to a program table or a calculation formula built in the central processing module, and then is used to control the work of the TIMER module.

Figure 5:
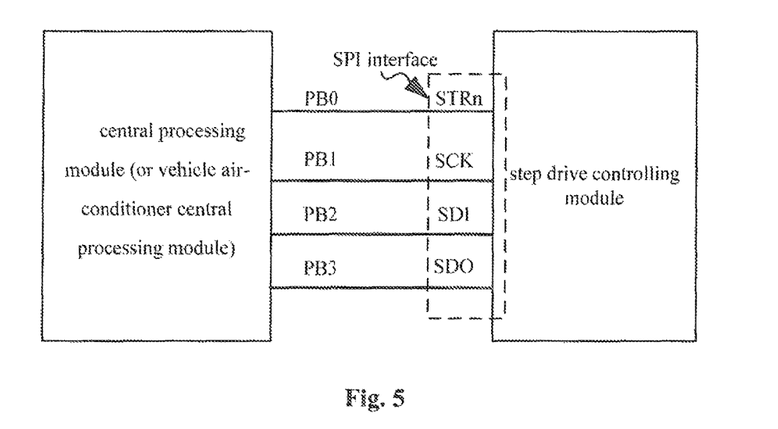
FIG. 5 is a schematic view showing another connection manner between related pins of a central processing module or a vehicle air-conditioner central processing module and a step drive controlling module.

FIG. 5 is a schematic view showing another manner of connection between the related pins of the central processing module (or the vehicle air-conditioner central processing module) and the step drive controlling module 27. The step drive controlling module 27 is connected to the central processing module via the SPI interface, and the related pins of the step drive controlling module 27 include an SDI (serial data input) pin, an SDO (serial data out) pin, an SCK (serial clock) pin, and an STRn (chip select) pin, which are respectively connected to pins PB2, PB3, PB1 and PB0 of the central processing module. The value of the single step size, by which the motor moves, is the product of a set micro-step and a "current micro-step number segment", and does not exceed a full step at the most. The micro-step is set as 1/N of a full step, and the current micro-step number segment is n, and the value of the single step size, by which the motor moves, equals to n/N, where, n and N are integer numbers, and 1≤n≤N, and in this way, by controlling the value of the single step size of the electronic expansion valve, the adjustment to the action speed of the electronic expansion valve is achieved. For example, the action speed of the electronic expansion valve may be adjusted by controlling an action frequency of the single step size or the value of the single step size. For example, the micro-step is set as ¹⁄₁₆ of a full step, and the current micro-step number segment is n, then the value of the single step size, by which the motor moves, equals to n/16, where, 1≤n≤16. The step drive controlling module 27 receives a set data segment of micro-step value and a current micro-step number segment via the SPI interface and sends them to a step drive control center 270 thereof. The step drive control center 270 controls the drive module 28, to allow waveforms of the electricity provided to the coils to change according to the requirements of the set data segment of micro-step value and the current micro-step number segment. The set data segment of micro-step value determines the minimum value of the single step size of the motor, for example, if the data segment of micro-step value is set as ¼ micro-step, the minimum value of the single step size of the motor is ¼ of a full step. The action speed of the electronic expansion valve may also be adjusted by changing the motor operating micro-step value set in the step drive controlling module, and when a fine-adjustment is required, a small micro-step set value is employed; and when a quick action is required, a large micro-step set value is employed. The current micro-step number segment determines that how many micro-steps should the motor move in the current action, and determines, together with the set data segment of micro-step value, the single step size of the motor. For example, the set data segment of micro-step value defines N as ⅛ micro-step, and the current micro-step number segment n is 4, then the single step size of the motor is ½ of a full step.

Figure 12:
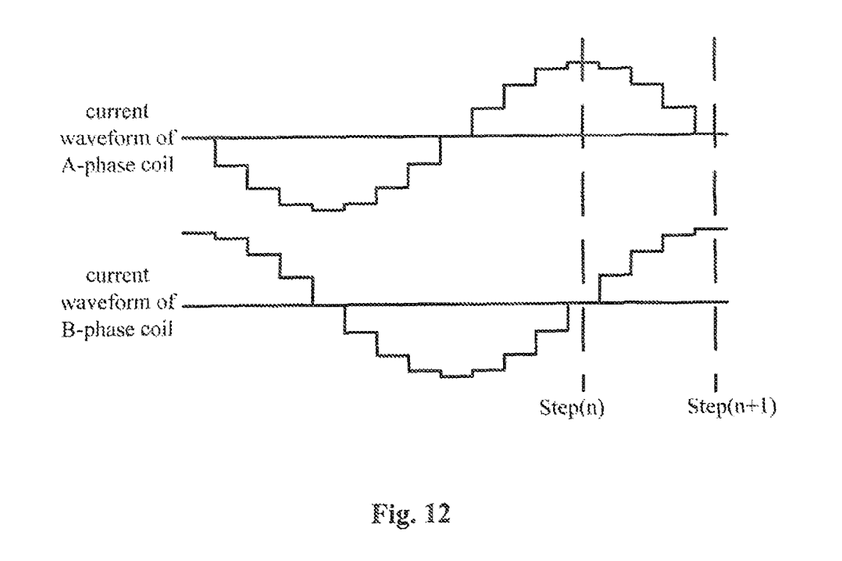
FIG. 12 is a schematic view showing waveforms of electricity in a A-phase coil and a B-phase coil in the case that the setting data segment of the micro-step value is ¼ micro-step.

Reference is made to FIG. 12, which is a schematic view showing waveforms of electricity in the A-phase coil and the B-phase coil, in the case that the set data segment of the micro-step value is ¼ micro-step, where, the motor moves by a full step from Step (n) to Step (n+1).

Figure 6:
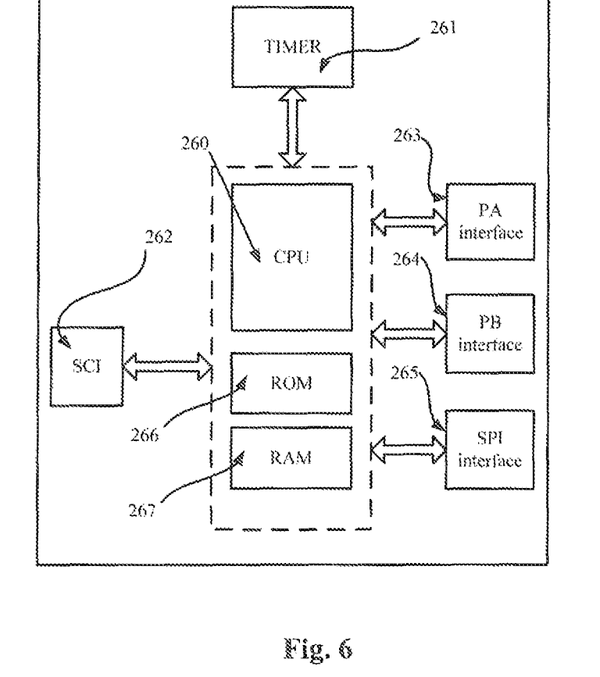
FIG. 6 is a schematic block diagram of an embodiment of a central processing module.
Figure 7:
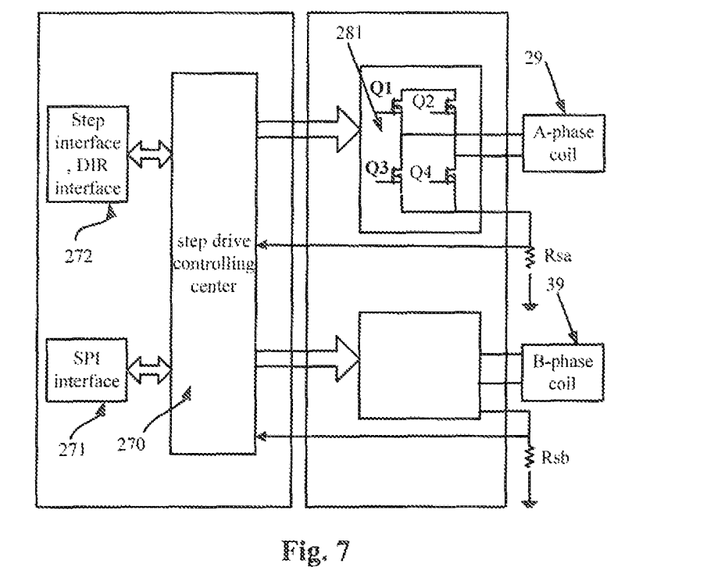
FIG. 7 is a schematic block diagram showing the connection between the step drive controlling module and a drive module in an embodiment.

Reference is made to FIGS. 6 and 7. FIG. 6 is a schematic block diagram of an embodiment of a central processing module; and FIG. 7 is schematic block diagram showing the connection between the step drive controlling module and a drive module in an embodiment. The central processing module 26 includes a serial communication interface (SCI) 262, a timer (TIMER) module 261, a central processing unit (CPU) 260, a Read Only Memory (ROM) 266, a Random Access Memory (RAM) 267, a PA interface 263, a PB interface 264, and an SPI interface 265. The PA interface 263 and the PB interface 264 are universal input/output interfaces (I/O), and each includes multiple universal I/O pins. The SPI interface 265 is a universal peripheral interface, and may be in communication with the SPI interface of the step drive controlling module. The SCI interface 262 of the central processing module 26 may be configured to communicate with the LIN transceiver module 25. The timer module 261 is configured for timing, and also for generating an interrupt signal when the set interval elapses and sending the interrupt signal to the central processing unit 260. The ROM storage 266 and the RAM storage 267 are configured to store programs and data. The central processing unit 260 performs an arithmetic logic calculation according to the programs and data stored in the ROM and RAM, to control the above various modules. When it is required to perform speed control, for example, the central processing module 26 receives initialization information via the SCI interface 262, and then obtains a corresponding motor speed by calculation with a program, and then assigns a corresponding timing value to the timer module 261 according to the speed, and after the timer module runs, the timer module generates an interrupt signal when the assigned interval elapses, and then the corresponding interrupt program comes into operation.

The step drive controlling module 27 includes a STEP interface, a DIR interface 272 and an SPI interface 271 and the above-motioned step drive control center 270. The drive module 28 includes two H-type bridges 281 each constituted by four switching tubes, and the two H-type bridges 281 respectively drive the A-phase coil 29 and the B-phase coil 39 of the electronic expansion valve. The step drive controlling module 27 obtains the electricity flowing though the coils by measuring voltages at two ends of electricity sampling resistances Rsa and Rsb. The step drive control center 270 in the step drive controlling module 27 receives a related control signal for the step control sent from the central processing module via the STEP interface and the DIR interface 272 or via the SPI interface 271, and then controls the drive module 28, to allow the change of the electricity flowing through the A-phase coil and the B-phase coil to meet the requirements of the value of the step size and the motor drive direction. In the process of the electricity flowing through the coils, the A-phase electricity and the B-phase electricity are respectively fed back in real time to the step drive controlling module 27, and are configured to monitor the electricity values in the coils, to allow the step drive controlling module 27 to control the switching of the switching tubes in the drive module 28.

Figure 8:
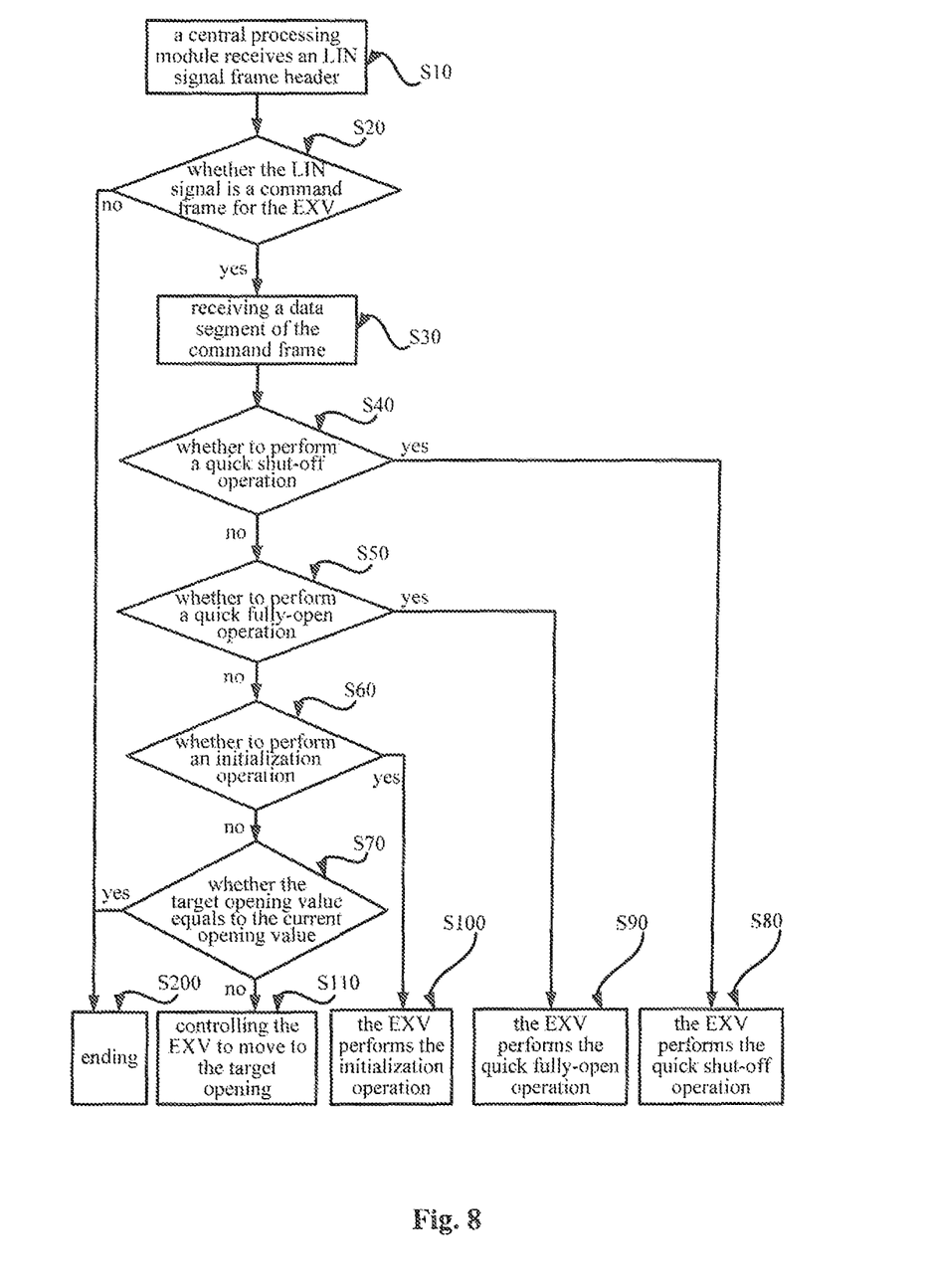
FIG. 8 is a schematic flow chart showing procedures performed after the central processing module receives an LIN signal.
Figure 9:
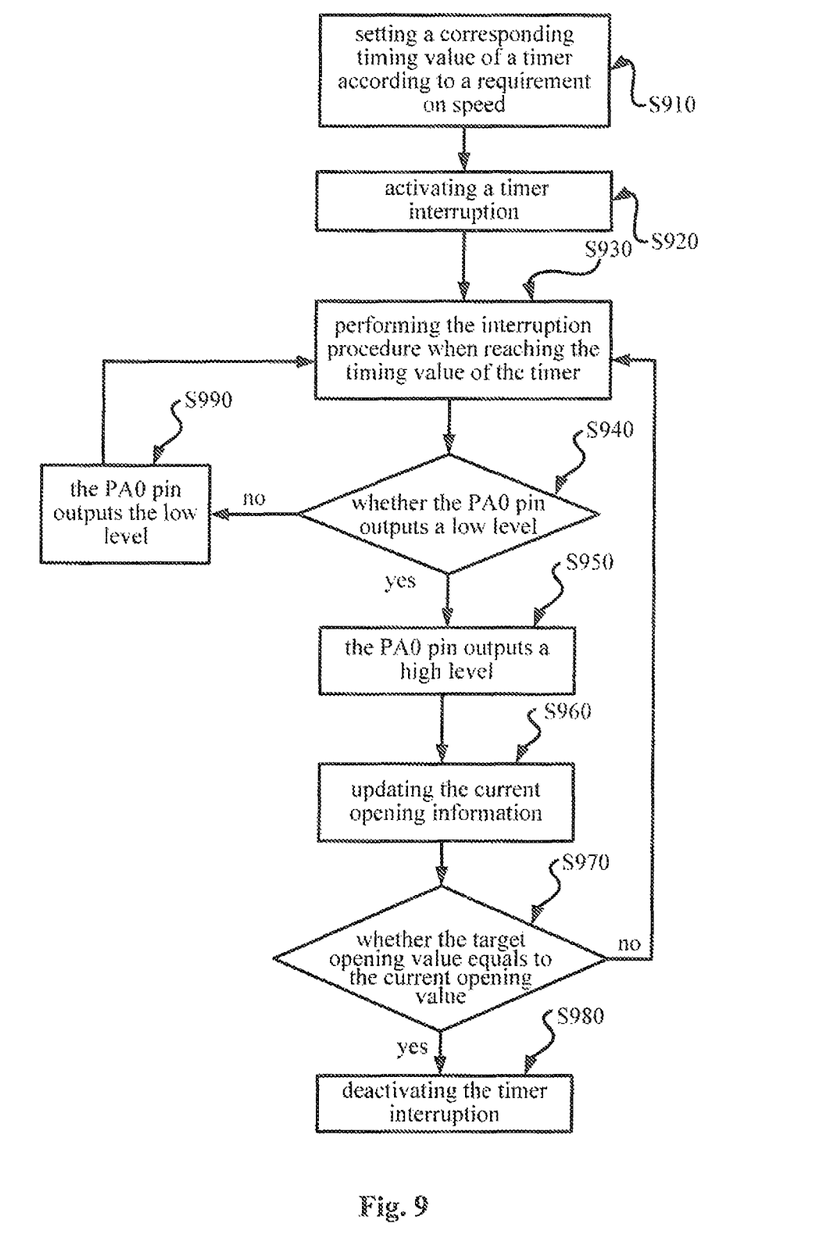
FIG. 9 is a schematic flow chart of an embodiment of step S90 in FIG. 8.
Figure 10:
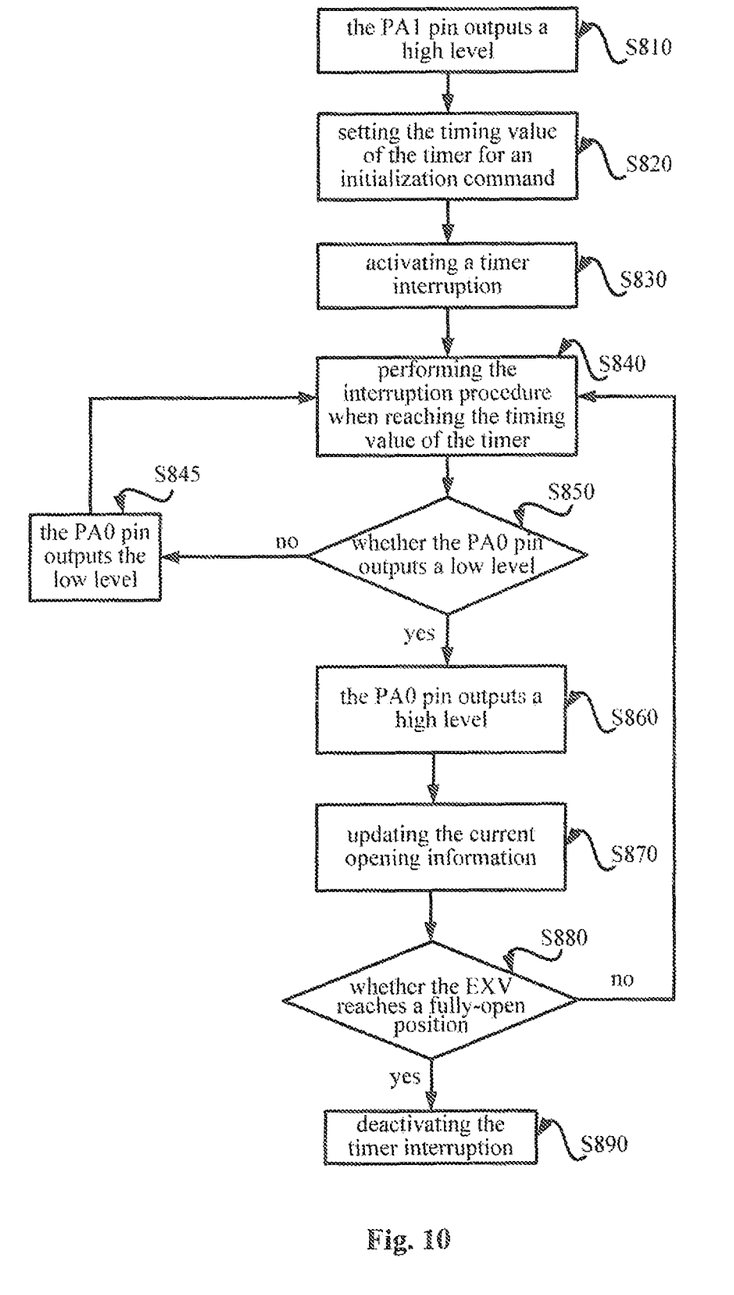
FIG. 10 is a schematic flow chart of another embodiment of step S80 in FIG. 8.

The control operating process of the control system according to the present application is described hereinafter. Reference is made to FIGS. 8 to 10. FIG. 8 is a schematic flow chart showing procedures performed after the control system according to the first embodiment of the present application receives an LIN signal; FIG. 9 is a schematic flow chart of an embodiment of step S90 in FIG. 8, which schematically shows a method for changing the duration of voltage switching cycle of the STEP pin; and FIG. 10 is a schematic flow chart of an embodiment of step S80 in FIG. 8. The operation of the electronic expansion valve may include a quick shut-off operation, a quick fully-open operation, an initialization operation and a flow adjustment operation. For example, in the case that the control system receives a quick shut-off signal, and parses the signal and determines the parsed signal as valid, the control system controls the electronic expansion valve to shut off at the highest operation speed; in the case that the control system receives a quick fully-open operation signal, and parses the signal and determines the parsed signal as valid, the control system controls the electronic expansion valve to perform a fully-open operation at the highest operation speed; and in the case that the air-conditioning system is initially started to operate or is to be closed, the initialization operation is performed. The initialization operation of the electronic expansion valve refers to a process in which the electronic expansion valve confirms its capability in operating in all of the openings, for example, operating from the current opening to the degree opening of 100% first, then operating to the opening of 0, and finally operating to a default opening.

The vehicle air-conditioning system may control the EXV to perform initialization operation in cases of ignition on, or ignition off, or air-conditioning system on, or air-conditioning system off (A/C off), and may also control the EXV to perform the initialization operation in the case that the vehicle air-conditioning system considers it is necessary (for example, when it considers that the EXV may have a breakdown). The purpose of the initialization operation is to perform self-inspection to confirm that the EXV can operate in the entire opening range, and the initialization operation does not involve flow adjustment, hence an operation speed of the initialization operation may be different from the operation speed in performing flow adjustment. Since the initialization process is long, the initialization process may be sped up by operating at a speed higher than the speed in performing the flow adjustment. In the case that the processor in the control system, for example the central processing module, receives an initialization signal, parses the signal and determines the parsed signal as valid, the processor chooses a corresponding speed and controls the EXV to perform an initialization operation at the corresponding speed. The speed of the initialization operation may be pre-set in the central processor module, and may also be obtained by the central processing module through calculation after receiving the signal. If the initialization signal is not defined, whether to perform the initialization operation may also be determined according to the scope of the numerical value in a target opening signal. For example, if it is stipulated that the value of the target opening signal ranges from 10% to 90% in flow adjustment, and when the EXV receives the signal having the value of 0% or 100% opening, the EXV operates at the initialization speed.

The flow adjustment of the EXV is to drive the EXV to operate to a designated target opening according to the requirement of a target opening signal. In a flow adjustment stage, the EXV chooses a corresponding speed by parsing the target opening signal and the speed signal and controls the step motor to act in the corresponding speed.

The control operation process of the control system includes the following steps.

Step S10 includes receiving, by a central processing module of the control system, an LIN signal frame header.

Step S20 includes determining, by the control system, whether the received LIN signal frame header is configured to control an EXV; and, if the received LIN signal frame header is configured to control the EXV, proceeding to step S30; and if the received LIN signal frame header is configured to control the EXV, proceeding to step S200.

Step S30 includes receiving, by the central processing module of the control system, a data segment of the LIN signal.

Step S40 includes determining whether the received signal is to require the EXV to shut off quickly, and if it is determined that the received signal is to require the EXV to shut off quickly, proceeding to step S80, and if it is determined that the received signal is not to require the EXV to shut off quickly, proceeding to step S50.

Step S50 includes determining whether the received signal is to require the EXV to fully open quickly, and if it is determined that the received signal is to require the EXV to fully open quickly, proceeding to step S90, and if it is determined that the received signal is not to require the EXV to fully open quickly, proceeding to step S60.

Step S60 includes determining whether the received signal is to require the EXV to perform an initialization operation, and if it is determined that the received signal is to require the EXV to perform the initialization operation, proceeding to step S100; and if it is determined that the received signal is not to require the EXV to perform the initialization operation, proceeding to step S70.

Step S70 includes determining whether a target opening value of the EXV equals to a current opening value, and if it is determined that the target opening value of the EXV equals to the current opening value, proceeding to step S200, and if it is determined that the target opening value of the EXV does not equal to the current opening value, proceeding to S110.

Step S80 includes controlling the EXV to perform a quick shut-off operation.

Step S90 includes controlling the EXV to perform a quick fully-open operation.

Step S100 includes controlling the EXV to perform the initialization operation at a quick operation speed.

Step S110 includes controlling the EXV to operate in a direction towards the target opening.

Step S200 includes ending the process.

In the above control flow, the LIN signal may be received at the same time, and then the subsequent determinations are performed.

In addition, in the above step S80, the operation of the fully open part of the initialization may include the following sub-steps.

Step S810 includes outputting, by a PA1 pin of the central processing module, a high level, and proceeding to step S820.

Step S820 includes setting a timing value of a timer module for an initialization command, and proceeding to step S830.

Step S830 includes activating a timer interruption, the timer starting to operate, and proceeding to step S840.

Step S840 includes performing an interruption procedure when reaching the set timing value of the timer module, and proceeding to step S850.

Step S850 includes determining whether a PA0 pin outputs a low level, and if it is determined that the PA0 pin outputs the low level, proceeding to step S860; and if it is determined that PA0 pin does not output the low level, proceeding to step S845.

Step S845 includes outputting, by the PA0 pin, the low level, and proceeding to step S840.

Step S860 includes outputting, by the PA0 pin, a high level, and proceeding to step S870.

Step S870 includes updating a current opening information of the EXV, and proceeding to step S880.

Step S880 includes determining whether the EXV reaches a fully-open position, and if it is determined that the EXV reaches the fully-open position, proceeding to step S890; and if it is determined that the EXV does not reach the fully-open position, proceeding to step S840.

Step S890 includes deactivating the timer module interruption, and the timer module stopping running.

In addition, in step S80, the operation of the fully-close part of the initialization may refer to the above sub-steps, and it is only required to reverse the operation direction signal. In addition, the part for allowing the EXV to reach a fixed opening in the initialization may refer to the following description regarding the opening adjustment, which will not be further described in detail here.

The operation of step S90 in the control flow may include the following sub-steps.

Step S910 includes setting a corresponding timing value of a timer module according to a speed requirement, and proceeding to step S920.

Step S920 includes activating a timer module interruption, the timer module starting to operate, and proceeding to step S930.

Step S930 includes performing an interruption procedure when reaching the set timing value of the timer module, and proceeding to step S940.

Step S940 includes determining whether the PA0 pin outputs a low level, and if it is determined that the PA0 pin outputs the low level, proceeding to step S950; and if it is determined that the PA0 pin does not output the low level, proceeding to step S990.

Step S950 includes outputting, by the PA0 pin, a high level, and proceeding to step S960.

Step S960 includes updating a current opening information of the EXV, and proceeding to step S970.

Step S970 includes determining whether a target opening value of the EXV equals to the current opening value, and if it is determined that the target opening value of the EXV equals to the current opening value, proceeding to step S980; and if it is determined that the target opening value of the EXV does not equal to the current opening value, proceeding to step S930.

Step S980 includes deactivating the timer module interruption, and the timer module stopping running.

Step S990 includes outputting, by the PA0 pin, the low level, and proceeding to step S930.

In the program, the operation speed of the EXV may be sent from the vehicle air-conditioner controller, and received by the central processing module, and then the central processing module controls the EXV to perform at the operation speed. In addition, the operation speed of the EXV may also be obtained by the central processing module through calculation.

In a control flow according to a second embodiment, the central processing module of the vehicle air-conditioner may determine to perform which operation in "EXV performing quick shut-off operation", "EXV performing quick fully-open operation", "EXV performing initialization operation", "controlling the EXV to move to a target opening" according to input signals inputted by the input processor 31 and the communication interface 38 and in conjunction with the own program of the central processing module. The steps of the control flow may refer to the above schematic flow chart. For example, the central processing module 32 may send the step size information and the direction information to the step drive controlling module 27 in the manner shown in FIG. 4, or in a manner of SPI communication.

Figure 11:
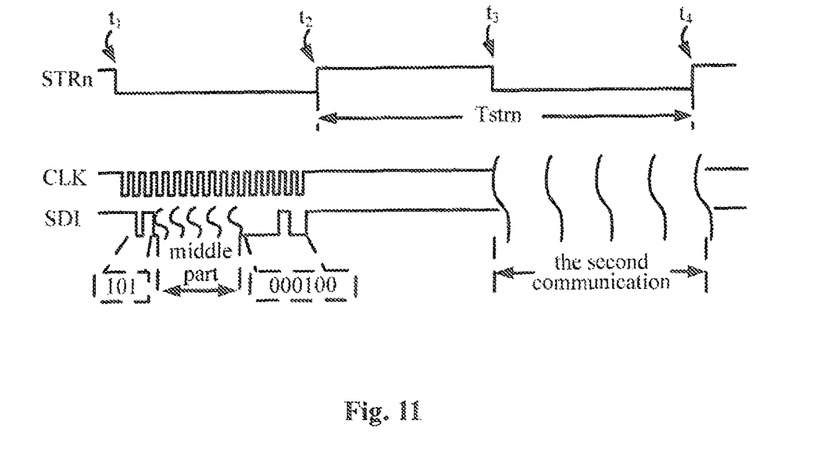
FIG. 11 is a schematic view showing Serial Peripheral Interface (SPI) communication between the central processing module and the step drive controlling module.

FIG. 11 is a schematic view showing a manner of SPI communication between the central processing module 32 and the step drive controlling module 27. A chip select signal, a clock signal and a slave data input signal may each be outputted from the central processing module 32 to the step drive controlling module. When the PB0 pin of the central processing module 32 outputs a signal to allow the chip select pin to change from a high level to a low level (at instants t1, t3), the step drive controlling module 27 is chosen by the central processing module 32 as a slave communication device, to start one SPI communication between the central processing module 32 and the step drive controlling module 27. Subsequently, the central processing module outputs a clock signal to the clock pin via the PB1 pin, and outputs data, which is to be sent, to the SDI pin via the PB2 pin. When it is at a rising edge of the clock (CLK) signal, the step drive controlling module stores the data at the SDI pin corresponding to this instant into an internal shift register. Hence by continuously sending CLK signals, the step drive controlling module may continuously store the data at the SDI pin into the internal shift register. The meaning of the data at the SDI pin may be determined by the step drive controlling module. FIG. 11 only schematically shows one situation of the data at the SDI pin, which has totally 16 bits (the 7 bits in the middle are not shown). The initial two bits are address field of the target register, and are used to indicate a target address of the data sent currently, for example, the initial two bits "10" in FIG. 11 indicate the address of an operation register. The third bit is an enabling mark, and only when this bit is valid (for example is 1), the step drive controlling module can control the drive module. The last six bits are the current micro-step number segment, and for the current micro-step number segment, the data of the forward and reverse directions are represented by the form of complement numbers, and the maximum number is 16. The set data segment of micro-step value is required to be written into other operation registers before the current SPI communication, for example, to be written into the configuration register 0 with an address of "00".

At the instant t2, when the chip select signal changes from the low level to the high level, the data in the internal shift register are transferred into the operation register, and at the same time, the step drive controlling module controls the drive module according to the current value in the operation register, to allow the electricity flowing through the coils to change, thereby controlling the operation of the motor. That is, the electricity flowing through the coils change at the instant t2, and are maintained in the changed values till the instant t4. The single step size of the motor is determined by the set data segment of the micro-step value and the current micro-step number segment. For example, when the single step size is set as $1/16$ micro-step, the current micro-step number segment of 000100 represents that the value of the current step size is four $1/16$ micro-steps in the original direction, i.e., $1/4$ of a full step. In this way, in a period Tstrn, the current step size is $1/4$ of a full step. Further for example, when the single step size is set as $1/16$ micro-step, the current number segment of single step size of 000011 represents that the value of the current step size is three $1/16$ micro-steps in the original direction, i.e., $3/16$ of a full step.

Hence, the operation speed of the motor may be controlled by controlling the length of the period Tstrn, or changing the value of the single step size, that is, the operation speed of the electronic expansion valve may be controlled by controlling the operation frequency of the electronic expansion valve and the magnitude of the value of the single step size of the electronic expansion valve. For the first embodiment introduced above, the length of the period Tstrn may also be controlled by utilizing the timer module of the central processing module.

For each of the first embodiment and the second embodiment, the step drive controlling module may be controlled by the manner shown in FIG. 4 or the manner shown in FIG. 5.

In addition to the quick shut-off operation, the quick fully-open operation and the initialization operation, more situations that may require the EXV to change speed are listed hereinafter. When the air-conditioning system senses that the degree of superheat increases abruptly, which means that the load increases sharply, the electronic expansion valve is required to open quickly to provide refrigerant, for example, when the vehicle is in a process of accelerating continuously, such as switching from a normal urban operation condition to a high speed operation condition, or switching from an original idle speed situation or a traffic jam situation to a steady urban operation condition. In the case that the air-conditioning system detects an abnormal high pressure, which means that the load rises sharply, the electronic expansion valve is required to open quickly, to relief the pressure to a normal range as soon as possible. When the degree of superheat decreases abruptly, which means that the load decreases abruptly, the electronic expansion valve is required to shut off quickly, to reduce refrigerant, which, in one aspect, may stabilize the system operation condition quickly, and in another aspect, may avoid liquid hammer of the compressor. In the above listed situations, the control system is desired to control the EXV to perform flow adjustment at a high speed. Other situations in which the control system is desired to control the EXV to perform flow adjustment at a high speed may further include: switching between refrigerating and heating, start-up process, and halting process.

In the case that the degree of superheat oscillates, it is desired that the EXV operates relatively slow. The oscillation generally happens in the case of a low load, or in the case that the control of the compressor and the control of the expansion valve interfere with each other. In these cases, the control system is desired to control the EXV to perform flow adjustment at a low speed. The air-conditioning system may also instruct the EXV to employ a different speed according to the current opening position of the EXV. For example, in the case that the opening is smaller than a threshold, a low speed is employed; and in the case that the opening is higher than a threshold, a high speed is employed. These procedures may be set and controlled according to the requirements of the system. In addition, the air-conditioning system may also instruct the EXV to employ a corresponding different speed according to different strokes of the EXV at each time. For example, in the case that the stroke range at a certain time is smaller than a threshold, a low speed is adopted; and in the case that the stroke range at the certain time is higher than a threshold, a high speed is adopted.

The above instructions from the air-conditioning system requiring the EXV to operate at various speeds can be realized by using the central processing module to provide a speed signal and send the speed signal to the EXV in the first embodiment (as shown in FIG. 3); and may be realized in the following manner in the second embodiment, the EXV obtains a speed signal through calculation according to the inputs of the input processor 31 and the communication interface 38 and in conjunction with its own program; and the above manners may be adjusted as desired. In addition, though the above embodiment is described by taking a two-phase step motor as an example, in addition to the two-phase step motor, a multiple-phase step motor may also be employed.

Through the control of the control system, the present application allows the time cycle corresponding to the single-time step operation of the electronic expansion valve to be adjustable, and allows the current step size corresponding to the single-time step to be adjustable, thereby allowing the operation speed of the electronic expansion valve to be adjustable, and allowing the electronic expansion valve to operate quickly in initialization, and to operate at an adjustable operation speed in opening adjustment, and allowing the maximum speed in normal adjustment to be smaller than or equal to the maximum speed in the initialization operation, and allowing the minimum speed in normal adjustment to be smaller than the minimum speed in the initialization operation. In this way, the requirements for quick start-up and quick adjustment can be met. For example, providing that a normal operation speed of an electronic expansion valve in a normal air-conditioning system is 1, and the operation speed may reach 1 to 1.5 times or even exceeding 2 times of the normal operation speed when in the quick operation; the operation speed of the electronic expansion valve in the initialization operation may exceed 1.5 times of the normal operation speed, and in normal adjustment, the speed may be adjustable between 0.1 to 1.5 times of the normal operation speed. For example, in a stable area, the speed may be low, and the adjustment may be performed by a micro-step manner, and the speed may range from 0.1 times to 0.75 times of the normal operation speed; while in the case that the target opening is large, the operation speed may range from about 1 time to 1.5 times of the normal operation speed. However, when it requires to be stable relatively, the electronic expansion valve has a slow operation speed, and may further achieve a relatively stable adjustment, to allow the system to keep operating stably. This may reduce or avoid the oscillation of the electronic expansion valve in the control process, and achieve the most energy-saving control manner. In addition, the speed of the initialization operation may also be fixed, thus the maximum speed and the minimum speed in the initialization operation are equal, and even though the maximum speed in the normal adjustment is smaller than or equal to the speed in the initialization operation.

Though each of the above embodiments is illustrated by taking the vehicle air-conditioning system as an example, the adjustment control manner according to the present application may be also applied in other refrigerating circulation system with an electronic expansion valve. In addition, for illustrating clearly in the above embodiments, the step drive controlling module and the drive module are divided according to functions, and the step drive controlling module and the drive module may be arranged separately, and may also be arranged together, i.e., the function of the drive module is placed into the chip where the step drive controlling module is located, which is also applicable.

It should be noted that, the above embodiments are only intended for describing the present application, and should not be interpreted as limitation to the technical solutions of the present application. Although the present application is described in detail in conjunction with the above embodiments, it should be understood by the skilled in the art that, modifications or equivalent substitutions may still be made to the present application by those skilled in the art; and any technical solutions and improvements thereof without departing from the spirit and scope of the present application also fall into the scope of the present application defined by the claims.

What is claimed is:

1. A refrigerant circulation system, comprising a control system and an electronic expansion valve, the control system comprising a central processing module and a step drive controlling module, wherein, the central processing module is configured to receive input information, generate by calculation a control signal for the electronic expansion valve, send the control signal generated for the electronic expansion valve to the step drive controlling module, and register or store current opening information of the electronic expansion valve;

in the case that no drive module for the electronic expansion valve is provided in the control system separately, the step drive controlling module is configured to receive the control signal sent from the central processing module and configured to control the electronic expansion valve, and provide electricity to coils of the electronic expansion valve, wherein the electricity is sent by the central processing module and meet a requirement of the control signal for controlling the electronic expansion valve;

in the case that a drive module for the electronic expansion valve is provided in the control system, the step drive controlling module is configured to receive the control signal sent from the central processing module and configured to control the electronic expansion valve, and control the drive module to allow a change of electricity flowing through coils of the electronic expansion valve to meet a requirement of the control signal sent from the central processing module and configured to control the electronic expansion valve; the drive module is configured to provide electricity to the coils of the electronic expansion valve according to a requirement of a signal from the step drive controlling module; and an operation of the electronic expansion valve in the refrigerant circulation system comprises an initialization operation stage and a flow adjustment operation stage, and a maximum operation speed of the electronic expansion valve in the flow adjustment operation stage is smaller than or equal to a maximum operation speed of the electronic expansion valve in the initialization operation stage, and a minimum operation speed of the electronic expansion valve in the flow adjustment operation stage is smaller than a minimum operation speed of the electronic expansion valve in the initialization operation stage.

2. The refrigerant circulation system according to claim 1, wherein the electronic expansion valve in the refrigerant circulation system has a fixed operation speed in the initialization operation stage, and has an adjustable operation speed in the flow adjustment operation stage, and the adjustable operation speed of the electronic expansion valve in the flow adjustment operation stage is smaller than or equal to the operation speed of the electronic expansion valve in the initialization operation stage.

3. The refrigerant circulation system according to claim 1, wherein the central processing module comprises a timer module, and the central processing module is configured to change a timing value set in the timer module, and when the timing value is reached, the central processing module is configured to provide a corresponding level signal to the step drive controlling module, and the step drive controlling module is configured to receive the corresponding level signal, and control the electronic expansion valve to operate by a single step size in the case that the corresponding level signal changes validly, to adjust the operation speed of the electronic expansion valve by controlling an operation time of the single step size of the electronic expansion valve.

4. The refrigerant circulation system according to claim 1, wherein the central processing module is connected to the step drive controlling module by an SPI interface, and the step drive controlling module is configured to receive, via the SPI interface, a value of a single step size for the operation of a motor of the electronic expansion valve sent from the central processing module, the value of the single step size is the product of a set micro-step and a current micro-step number segment, and does not exceed a full step at the most, the micro-step is set as 1/N of a full step, the current micro-step number segment is n, and the value of the single step size, by which the motor moves, equals to n/N, wherein, n and N are each an integer number, and $1 \leq n \leq N$, and the operation speed of the electronic expansion valve is adjusted by controlling the value of the single step size of the electronic expansion valve.

5. The refrigerant circulation system according to claim 3, wherein the operation speed of the electronic expansion valve is adjusted by changing the micro-step value, by which the motor moves, set in the step drive controlling module, and a micro-step set value employed in a fine-adjustment is smaller than the micro-step set value employed in a quick action.

6. The refrigerant circulation system according to claim 1, wherein the refrigerant circulation system is a vehicle air-conditioning system, and the control system further comprises an LIN transceiver module, the LIN transceiver module is connected to an LIN bus by an LIN line, and the LIN transceiver module is configured to receive voltage levels of digital signals from the LIN bus, transform the voltage levels of the digital signals, send the transformed result to the central processing module, and receive, transform and transfer a signal from the central processing module.

7. The refrigerant circulation system according to claim 6, wherein the signals on the LIN bus received by the LIN transceiver module via the LIN line comprise a control signal for the electronic expansion valve, and the control signal comprises a target opening signal corresponding to an opening to be reached by the electronic expansion valve, and an operation speed signal for the electronic expansion valve; the central processing module is configured to parse the control signal; and the central processing module is configured to calculate according to current opening information and target opening information, to obtain information about a step size and a driving direction of the motor to be provided to the step drive controlling module, and provide the information for controlling the operation of the electronic expansion valve to the step drive controlling module.

8. The refrigerant circulation system according to claim 6, the signals on the LIN bus received by the LIN transceiver module via the LIN line comprise a control signal for the electronic expansion valve, and the control signal comprises a target opening signal corresponding to an opening to be reached by the electronic expansion valve; the LIN transceiver module is configured to transform the voltage levels of the received digital signals and send the transformed result to the central processing module; the central processing module is configured to parse the control signal; and the central processing module is configured to calculate according to current opening information and target opening information, to obtain information about a step size, a driving direction of the motor and the operation speed to be provided to the step drive controlling module, and provide the information for controlling the operation of the electronic expansion valve to the step drive controlling module.

9. The refrigerant circulation system according to claim 6, wherein the operation of the electronic expansion valve in the refrigerant circulation system further comprises a quick shut-off operation stage, and a quick shut-off operation signal is received from the LIN bus via the LIN line, and after receiving the quick shut-off operation signal, the central processing module is configured to control the electronic expansion valve to perform a quick shut-off operation, and an operation speed of the electronic expansion valve in the quick shut-off operation stage is greater than or equal to the operation speed of the electronic expansion valve in the initialization operation stage.

10. The refrigerant circulation system according to claim 6, wherein the operation of the electronic expansion valve in the refrigerant circulation system further comprises a quick fully-open operation stage, and a quick fully-open operation signal is received form the LIN bus via the LIN line, and after receiving the quick fully-open operation signal, the central processing module is configured to control the electronic expansion valve to perform a quick fully-open operation, and an operation speed of the electronic expansion valve in the quick fully-open operation stage is greater than or equal to the operation speed of the electronic expansion valve in the initialization operation stage.

11. The refrigerant circulation system according to claim 1, wherein the refrigerant circulation system is an air-conditioning system of a vehicle, and the control system further comprises an input processor and a communication interface, the input processor is configured to receive various switch control signals inputted from an air-conditioner control panel, and/or signals detected by various sensors arranged in pipelines of the air-conditioning system, the input processor is configured to process or transform inputted switch control signals and/or sensor signals, and output the result to the central processing module; the communication interface is configured to receive a signal sent from other modules in the vehicle and transfer the received signal to the central processing module; the central processing module is configured to calculate according to the switch control signals and/or the sensor signals which are processed and then inputted by the input processor, the signals inputted via the communication interface and in conjunction with a control program and information stored in a storage of the central processing module, to obtain information about a target opening to be reached by the electronic expansion valve, and an operation speed for the electronic expansion valve.

12. The refrigerant circulation system according to claim 11, wherein the operation of the electronic expansion valve in the refrigerant circulation system further comprises a quick shut-off operation stage and/or a quick fully-open operation stage, a quick shut-off operation signal and/or a quick fully-open operation signal is received via the communication interface or the input processor, and after receiving the quick shut-off operation signal and/or the quick fully-open operation signal, the central processing module is configured to control the electronic expansion valve to perform a quick shut-off operation and/or a quick fully-open operation; an operation speed of the electronic expansion valve in the quick shut-off operation stage and/or the quick fully-open operation stage is greater than or equal to the operation speed of the electronic expansion valve in the initialization operation stage.

13. The refrigerant circulation system according to claim 11, wherein the operation of the electronic expansion valve in the refrigerant circulation system further comprises a quick shut-off operation stage and/or a quick fully-open operation stage, the electronic expansion valve is configured to determine, by the combination of a target opening signal and a speed signal, whether to perform the quick shut-off operation and/or the quick fully-open operation, and in the case that the target opening signal is 0 and the speed signal is a maximum value, the electronic expansion valve is configured to perform the quick fully shut-off operation; and in the case that the target opening signal is 100% and the speed signal is the maximum value, the electronic expansion valve is configured to perform the quick fully-open operation; and an operation speed of the electronic expansion valve in the quick shut-off operation stage and/or the quick fully-open operation stage is greater than or equal to the operation speed of the electronic expansion valve in the initialization operation stage.

14. The refrigerant circulation system according to claim 4, wherein the operation speed of the electronic expansion valve is adjusted by changing the micro-step value, by which the motor moves, set in the step drive controlling module, and a micro-step set value employed in a fine-adjustment is smaller than the micro-step set value employed in a quick action.

15. The refrigerant circulation system according to claim 2, wherein the refrigerant circulation system is a vehicle air-conditioning system, and the control system further comprises an LIN transceiver module, the LIN transceiver module is connected to an LIN bus by an LIN line, and the LIN transceiver module is configured to receive voltage levels of digital signals from the LIN bus, transform the voltage levels of the digital signals, send the transformed result to the central processing module, and receive, transform and transfer a signal from the central processing module.

16. The refrigerant circulation system according to claim 15, wherein the signals on the LIN bus received by the LIN transceiver module via the LIN line comprise a control signal for the electronic expansion valve, and the control signal comprises a target opening signal corresponding to an opening to be reached by the electronic expansion valve, and an operation speed signal for the electronic expansion valve; the central processing module is configured to parse the control signal; and the central processing module is configured to calculate according to current opening information and target opening information, to obtain information about a step size and a driving direction (i.e., rotational direction) of the motor to be provided to the step drive controlling module, and provide the information for controlling the operation of the electronic expansion valve to the step drive controlling module.

17. The refrigerant circulation system according to claim 15, the signals on the LIN bus received by the LIN transceiver module via the LIN line comprise a control signal for the electronic expansion valve, and the control signal comprises a target opening signal corresponding to an opening to be reached by the electronic expansion valve; the LIN transceiver module is configured to transform the voltage levels of the received digital signals and send the transformed result to the central processing module; the central processing module is configured to parse the control signal; and the central processing module is configured to calculate according to current opening information and target opening information, to obtain information about a step size, a driving direction of the motor and the operation speed to be provided to the step drive controlling module, and provide the information for controlling the operation of the electronic expansion valve to the step drive controlling module.

18. The refrigerant circulation system according to claim 3, wherein the refrigerant circulation system is a vehicle air-conditioning system, and the control system further comprises an LIN transceiver module, the LIN transceiver module is connected to an LIN bus by an LIN line, and the LIN transceiver module is configured to receive voltage levels of digital signals from the LIN bus, transform the voltage levels of the digital signals, send the transformed result to the central processing module, and receive, transform and transfer a signal from the central processing module.

19. The refrigerant circulation system according to claim 18, wherein the signals on the LIN bus received by the LIN transceiver module via the LIN line comprise a control signal for the electronic expansion valve, and the control signal comprises a target opening signal corresponding to an opening to be reached by the electronic expansion valve, and an operation speed signal for the electronic expansion valve; the central processing module is configured to parse the control signal; and the central processing module is configured to calculate according to current opening information and target opening information, to obtain information about a step size and a driving direction (i.e., rotational direction) of the motor to be provided to the step drive controlling module, and provide the information for controlling the operation of the electronic expansion valve to the step drive controlling module.

20. The refrigerant circulation system according to claim 2, wherein the refrigerant circulation system is an air-conditioning system of a vehicle, and the control system further comprises an input processor and a communication interface, the input processor is configured to receive various switch control signals inputted from an air-conditioner control panel, and/or signals detected by various sensors arranged in pipelines of the air-conditioning system, the input processor is configured to process or transform inputted switch control signals and/or sensor signals, and output the result to the central processing module; the communication interface is configured to receive a signal sent from other modules in the vehicle and transfer the received signal to the central processing module; the central processing module is configured to calculate according to the switch control signals and/or the sensor signals which are processed and then inputted by the input processor, the signals inputted via the communication interface and in conjunction with a control program and information stored in a storage of the central processing module, to obtain information about a target opening to be reached by the electronic expansion valve, and an operation speed for the electronic expansion valve.

* * * * *